United States Patent
Gladwin et al.

(10) Patent No.: US 6,339,709 B1
(45) Date of Patent: Jan. 15, 2002

(54) PERSONNEL LOCATING SYSTEM

(75) Inventors: Michael Gladwin, Upper Brookfield; David Dekker, Collingwood Park, both of (AU)

(73) Assignee: Commonwealth Scientific & Industrial Research Organisation, Campbell (AU)

( * ) Notice: Subject to any disclaimer, the term of this patent is extended or adjusted under 35 U.S.C. 154(b) by 0 days.

(21) Appl. No.: 09/448,898

(22) Filed: Nov. 29, 1999

Related U.S. Application Data

(63) Continuation of application No. PCT/AU98/00259, filed on Apr. 9, 1998.

(30) Foreign Application Priority Data

Apr. 9, 1997 (AU) ................................................ PO6098

(51) Int. Cl.$^7$ ................................................ H04Q 9/00
(52) U.S. Cl. ........................... 455/456; 455/9; 455/458; 342/465
(58) Field of Search ................................. 455/456, 457, 455/458, 31.3, 38.2; 342/358, 465; 340/573

(56) References Cited

U.S. PATENT DOCUMENTS

| | | | | |
|---|---|---|---|---|
| 4,495,496 A | * | 1/1985 | Miller, III | 340/825.54 |
| 4,533,871 A | * | 8/1985 | Boetzkes | 324/207 |
| 4,630,057 A | * | 12/1986 | Martin | 455/55 |
| 4,827,395 A | * | 5/1989 | Anders et al. | 364/138 |
| 5,432,838 A | * | 7/1995 | Purchase et al. | 455/55.1 |
| 5,525,967 A | * | 6/1996 | Azizi et al. | 455/277.1 |
| 5,650,770 A | * | 7/1997 | Schlager et al. | 340/573 |
| 5,977,913 A | * | 11/1999 | Christ | 342/465 |
| 6,127,975 A | * | 10/2000 | Maloney | 342/457 |

* cited by examiner

Primary Examiner—Daniel Hunter
Assistant Examiner—Thuan T. Nguyen
(74) Attorney, Agent, or Firm—Nixon & Vanderhye P.C.

(57) ABSTRACT

There is described a system and method for locating, and optionally monitoring the status of, a mobile entity in a given area fitted with a radio beacon. In one embodiment, the system features a network of bi-directional radio beacons which transmit on the same frequency at random intervals. A method for processing and relaying unique message identifiers throughout the system is disclosed which allows the vicinity of the mobile entity to be determined from any beacon in the network.

46 Claims, 2 Drawing Sheets

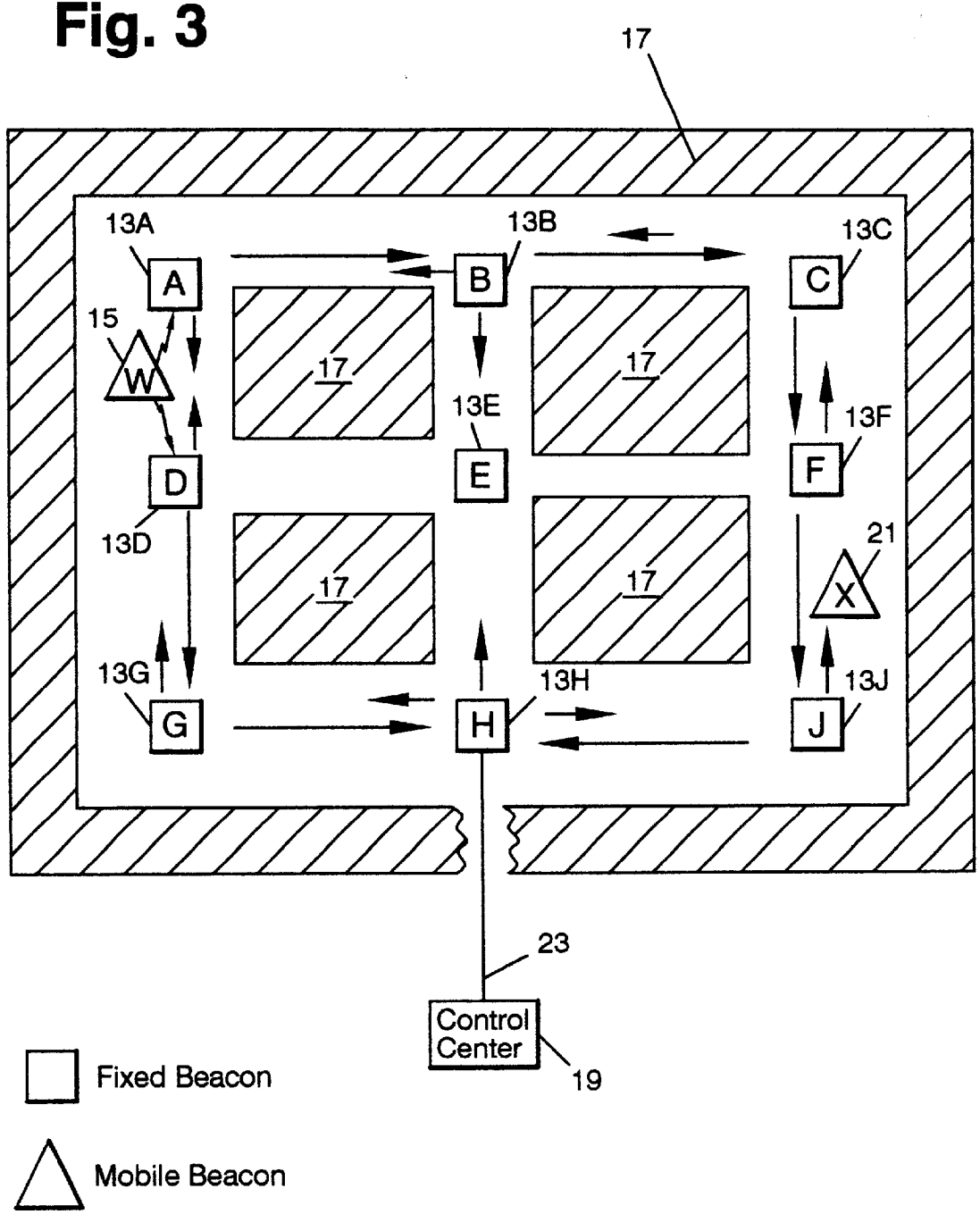

PERSONNEL LOCATING SYSTEM

This application is a continuation of PCT Application No. PCT/AU98/00259, filed Apr. 9, 1998, the disclosure of which is incorporated herein by reference.

FIELD OF INVENTION

This invention is concerned with a system for locating and monitoring the status of a number of individuals located in a particular area, and communication of information in a robust manner to locations throughout the area.

The present invention is particularly suited to monitoring and/or locating entities, be they human, animal, or machine, operating alone or in groups in hazardous or isolated environments. However, while the present invention will be described in the context of its use in a hazardous area, being an underground mine, it also finds application in any situation where it is required to monitor the status of individuals remotely.

BACKGROUND OF THE INVENTION

Mine communication systems providing routine voice, data and video information rely on a mine-wide high density communication pathway. Such systems require a sophisticated network which may not survive a catastrophic event such as an explosion or mine collapse.

There is a need for a reliable and extensible modular network which identifies the location of all personnel and their status at all times, even in the event of a serious incident.

Various individual monitoring systems have been described in the prior art.

For example, U.S. Pat. No. 4,709,330 describes a system for supervising and guiding workers at various locations, the system including a number of receivers arranged in a number of sections of a construction site for receiving infrared radiation emitted by workers to produce a detection signal which is sent on to a control room for processing. Canadian Patent application 2,018,109 describes a locater system for use in underground mining comprising a locater transmitter to be carried by the person to be located and a locater receiver to be carried by the searching person. However, none, of these prior art systems provide a relatively low cost and reliable system for monitoring the location and status of a number of personnel, or machine work-units, in a hazardous environment, nor do they provide a system in which collected information is available at locations throughout an area.

An object of the present invention is to provide a locating and monitoring system that alleviates, at least in part, one or more of the problems attending prior art systems. In particular, it is an object of the present invention to provide a reliable and robust system for determining the location and status of a number of individuals in an area or site, particularly in hazardous environments.

SUMMARY OF THE INVENTION

According to a first aspect the invention broadly provides a system for locating a mobile entity in an area including:

a) a network of fixed communication beacons for relaying messages, said fixed beacons arranged in predetermined locations;

b) a mobile communication beacon adapted to be attached to the entity to be located and for transmitting mobile messages, said mobile messages being coded to uniquely identify the message and to uniquely identify the mobile communication beacon;

the beacons being arranged so that operatively, the mobile communication beacon transmits said mobile messages to at least one fixed communication beacon of the network located in its vicinity, said at least one beacon modifying said message by appending a unique beacon identifier and transmitting the modified message to adjacent beacons for transmission throughout the beacon network so that the identity of the at least one fixed communication beacon which first modified the message is stored at each fixed beacon throughout the network.

According to a further aspect the present invention broadly provides a method for locating a mobile entity in an area containing a network of beacons, including fixed communication beacons and mobile communication beacons, said fixed beacons being located at recorded positions, said mobile entity being fitted with a mobile communication beacon, said method including the steps of:

a) transmitting from the mobile communication beacon a unique message, including data identifying said beacon, to a first one of said fixed communication beacons in the vicinity of said mobile beacon;

b) appending to said message a unique identifier associated with the first at least one fixed communication beacon, thereby forming a modified message;

c) repeatedly transmitting the modified message from communication beacon to adjacent beacons and storing details of the modified message, including the identity of the beacon which created the modified message at beacons throughout the network;

d) interrogating a beacon to determine the identity of the beacon which created the modified message in order to determine the vicinity of the mobile communication beacon at the time the unique message was transmitted.

Preferably, the present invention provides, a system for determining the approximate location of each one of a plurality of mobile entities located in an area, the system including:

a plurality of mobile beacons adapted to be worn or carried by each individual and being capable of generating a signal containing an identifier;

a network of at least two fixed beacons located throughout the operating area, each fixed beacon being capable of transmitting a signal and of receiving the signal generated by at least one mobile beacon and the signal generated by at least one other fixed beacon;

means by which the transmitted information may be self-routed to the beacons in the network where it may be stored or interrogated;

means by which the location of the mobile-beacons can be determined, stored and available from at least one other beacon; and a control or monitoring means capable of receiving the signal generated by at least one fixed beacon and therefrom providing an output indicative of the location of each said entity.

Preferably the invention provides a system for determining the approximate location of each one of a plurality of mobile entities located in an area and for monitoring at least operational parameter of each of said entitles, the system including:

a plurality of mobile beacons adapted to be worn or carried by each individual and being capable of generating a signal containing an identifier and data indicative of the at least one monitored vital sign, each transmitter being associated with a respective sensor capable of monitoring at least one vital sign of the entity wearing or carrying the transmitter;

a network of at least two fixed beacons located throughout the operating area, each fixed beacon being capable of transmitting a signal and of receiving the signal generated by at least one mobile beacon and the signal generated by at least one other fixed beacon;

means by which the transmitted information may be self-routed to the beacons in the network where it may be stored or interrogated;

means by which the location and the status of the entities associated with the mobile beacons can be determined, stored and available from at least one fixed beacon; and a control or monitoring means capable of receiving the signal generated by at least one fixed beacon and therefrom providing an output indicative of the location and status of each said entity.

The beacons transmit a signal which is preferably a short range RF signal The beacons, which may be fixed or mobile, preferably transmit at intervals a low-power short duration radio message, including an identification and status signal. Preferably the beacons used are functionally identical whether they be fixed or mobile.

A mobile beacon may be carried or worn by an entity in the area to be monitored. Such an entity will most frequently be a human worker but could also be an animal or mobile machine-unit, for example a mine robot. In the case of a human worker the mobile beacon may be conveniently integrated with an article of clothing such as headgear or footwear. For example the beacon may be integrated with the miner's lamp and battery pack. The mobile transmitter may be self-activated when the lamp is removed from the charger rack prior to a mine worker commencing a workshift. Preferably the mobile transmitter is capable of self-verifying normal operation. The mobile beacon may include means for allowing the wearer to transmit pre-coded messages to the control or monitoring means thereby allowing the wearer to convey information on his or other's status during an emergency. Preferably the beacons are coupled to at least one sensor.

Preferably the sensor, or sensors, to which a moble beacon is coupled is capable of monitoring a characteristic indicative of the operational status of the entity with which it is associated. Accordingly when worn by a human worker it is desirable that the sensor be capable of monitoring the wearer's respiration or pulse. Alternatively, by sensing the attitude of the wearer, it is possible to determine whether he or she is standing or lying which in turn may indicate whether the wearer is conscious or not.

The sensor may be sensitive to movement or vibration. Preferably the sensor is capable of measuring minute movement or some other physical parameter without the use of probes requiring penetration of the skin. The sensor may be a transducer, including piezoelectric, electromagnetic and resistive transducers. However, more preferably the sensor requires no transducer connection to the skin and may be a seismometer, accelerometer, or geophone adapted to detect chest wall movement or some other physical movement of the wearer. Alternatively the inventors have reported considerable success in determining the pulse of a wearer by means of conductivity loops sensitive to the depolarisation signals of the heart.

The sensor may be incorporated into the clothing, footwear or headgear of the individual. It may be incorporated into an expandable chest band that can be comfortably worn around the chest, or carried in the battery belt or battery pack, the device detecting chest expansion and contraction during breathing.

The sensor may be connected to the mobile beacon by a hardwired connection or it may communicate with the mobile transmitter by a wireless signal such as an infrared or RF signal.

The fixed beacons are located at intervals over the active area such that each beacon can receive the transmitted signal of at least one other. The fixed beacons are capable of both transmitting and receiving signals and have identity and message passing capability. Each beacon is capable of receiving a signal containing identification (of another beacon) and status information from mobile beacon and is further capable of packaging both personnel and network identification and status information into a message signal. Status information may include information derived from at least one environmental sensor coupled to said fixed beacon, for example information regarding the local dust concentration, temperature or availability of cabled power.

In order that the invention may be more readily understood, the invention will now be described in reference to the following non-limiting embodiment.

BRIEF DESCRIPTION OF THE DRAWINGS

FIG. 3 is a schematic diagram of a system in accordance with the invention installed at an underground mine Detailed Description of an

EMBODIMENT OF THE INVENTION

Figure 1:
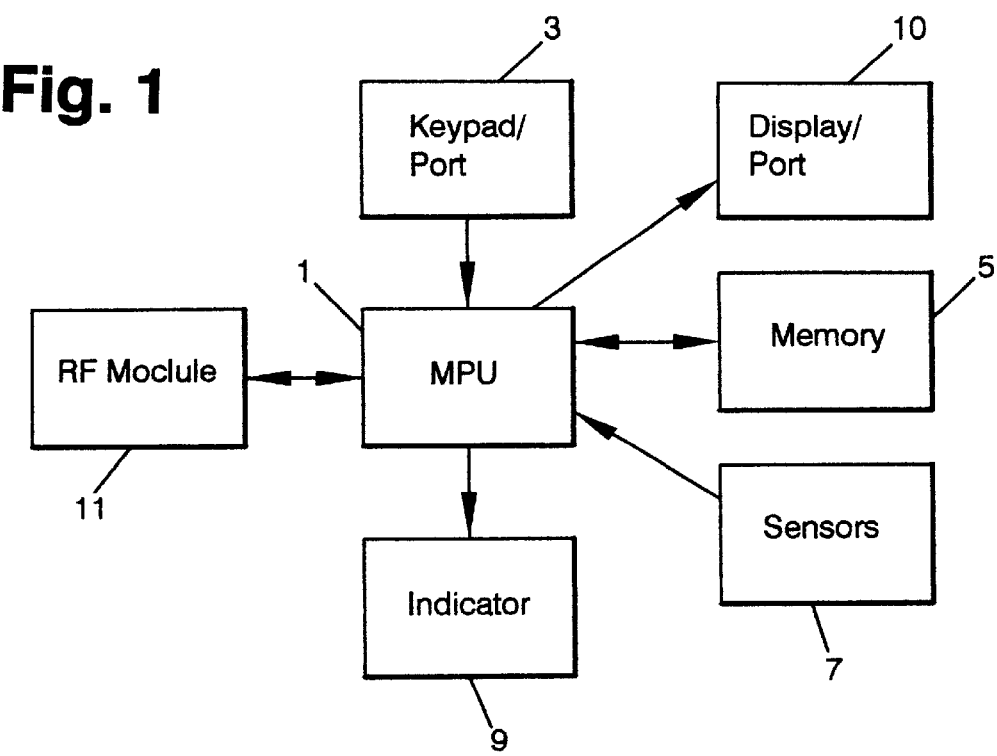
FIG. 1 is a schematic diagram of a beacon, either fixed or mobile, according to an embodiment of the present invention.

Referring now to FIG. 1 there is depicted a block diagram of a beacon according to the present invention. The beacon includes a microprocessor unit 1 for encoding and decoding messages, alternatively custom logic chips or eraseable programmable logic devices could be used. Coupled to the microprocessor is RF module 11 for receiving and transmitting radio signals to and from other beacons. It will be understood from the above that the term "beacon" is not to be understood as being limited to describing a unidirectional device. Whilst the preferred embodiment uses radio communication between beacons, direct-wired links could also be used or some combination of both.

Also comprising the beacon are, a memory module 5 for storing messages or message identifying data, and the identity code of the particular beacon, sensors 7, indicator 9, keypad port 3 and display port 10. In the event that the beacon will be placed in a fixed position, i.e. be used as a fixed beacon, sensors 7 will be sensitive to the environmental conditions in the mine, For example, the sensor may be sensitive to dust concentration, temperature, or whether or not power is available at that point in the mine. The construction of such sensors is well known in the art. Furthermore, indicators 9 will comprise either an audible or visual indicator, or possibly both. A visual indicator, when incorporated into a fixed beacon, might for example might be configured as an arrow which would light up in an emergency to indicate the safest route of escape from the mine. Keypad port 3 is available for the attachment of a data entry device such as a keypad or keyboard. Display port 10 is available for the attachment of of a display device, such as a liquid crystal display screen for the display of data, frequently being data produced in response to queries entered via the keypad port.

Alternatively, the beacon may be used as a mobile beacon in which case it will be attached to a mobile entity, for example a human mine worker or a robot. When attached to a human, sensors 7 could comprise, for example, a heart rate sensor or an attitude sensor for determining whether the worker is upright or lying down. Keypad port 3 may be fitted with a keypad so that the worker can input simple messages for transmission. Indicator 9, in the case of a mobile beacon may comprise a simple display for confirming that messages sent via the keypad port have been received by a fixed beacon.

Each fixed beacon is housed in a small blast-proof box and these are located at intervals of approximately 30–50 m over the active area of the mine. The network beacons may be operated under trickle charge from a mine power cable with a backup battery supply for use in emergencies. Alternatively, longlife batteries may be used as the sole source of power in order to obviate the need for expensive subterranean power cabling and to simplify the making of extensions to the network.

Figure 2:
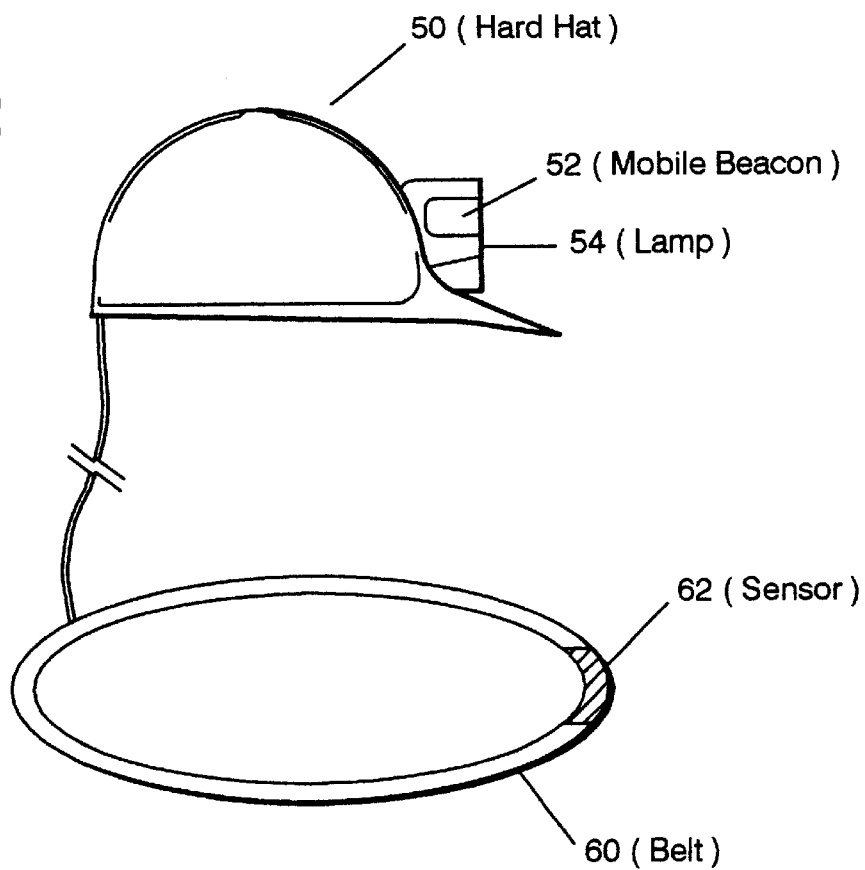
FIG. 2 is a schematic diagram of a miner's hat incorporating a mobile beacon and connected to a sensor in accordance with an embodiment of the invention.

Referring now to FIG. 2 there is depicted a schematic diagram of the apparatus to be worn by a miner in the presently described embodiment of the invention. The apparatus includes hardhat 50 to which is attached a miner's lamp 54 and a mobile beacon 52. The mobile beacon is electrically coupled to seismometer, or other sensor, for example a conductivity loop, 62 which is incorporated on belt 60 worn around the chest or waist of the miner. Such an arrangement, provides adequate information to determine the respiration, in the case of the seismometer, or pulse, in the case of the conductivity loop, of the miner. Indicators 9 incorporate visual and/or audible alarms which are activated in the event of the network detecting an alarm state in order to alert the wearer. Optionally the mobile beacons may be set so that the alarm indicators are activated should the wearer leave the area covered by the network thereby encouraging the wearer to re-enter the network area.

Referring now to FIG. 3 there is depicted a schematic diagram of network comprised of fixed beacons 13A–13J and mobile beacons W 15 and X, 21, all located within a subterranean mine, the structure of which is represented by cross-hatched areas 17. Located, preferably on the surface is a control centre 19 which is in communication with fixed beacon 13H by means of cabling 23. The control centre 19 may be based on a CPU capable of processing signals received from fixed beacon H over cabling means 23. The control centre includes peripherals for outputting identity and status information such as a visual display unit, printer and speaker. It also includes memory storage coupled to the CPU in which is stored a register of the identity codes for each fixed beacon and the geographical position in which it is located. As will be seen, such a register is optional depending on the choice of identifier codes used to uniquely identify each fixed beacon.

In operation mobile beacon W, 15, transmits at random intervals, typically of the order of sixty seconds, a low power, short duration, radio message. Whilst it is not essential, it is envisaged that all of the beacons, fixed and mobile, will operate on the same frequency and that all of them will make transmissions at random intervals. By randomising the time at which signals are transmitted, andby employing a degree of redundancy in the system, which will be explained later, the likelihood of signal collisions is reduced. The message includes the identification number of the mobile beacon, it may also include status information concerning the miner, for example an indication that the miner's pulse rate is within a comfortable level, and a sequence number which distinguishes the message from preceding and succeeding messages, for example the sequence number might simply be the time that the message is sent.

Upon transmitting the message, for ease of explanation the message will be denoted as "M1", it will be received by fixed beacons A and D. Upon being received by beacon D the beacon will append its own beacon identification number, which is unique throughout the system, to the message thereby forming, for example, message D-M1, store a copy of the modified message in its memory, or at least the identifying data of the message, and, after a random period of time, transmit the message D-M1. Similarly upon being received by beacon A the message M1 will be modified to form A-M1, stored in the memory of beacon A and, after a random period of time, transmitted to neighbouring beacons including B and D. From thereon the messages ripple throughout the remaining portion of the network however they are not reflected from beacon to beacon indefinitely because on receipt of a message by a beacon the beacon checks its memory and performs a comparison to determine if the message is to be relayed.

If the beacon has not previously received an identically sourced message, this can be determined by comparison of message identifier codes, then it stores a copy of the message identifier codes, or even the entire message depending on memory constraints, and passes on the message a random time later. However, if it has a record of an identically sourced message in its memory bank then it takes no further action so that the relaying of messages eventually dies out. In the present example the messages D-M1 and A-M1 will be propagated to all of the beacons in the system including second mobile beacon X, 21. Therefore the worker wearing mobile beacon X may interrogate it via keypad port 3 to determine the codes of the fixed beacons, which will be output to a display coupled to display port 10, that were in the vicinity of W when W transmitted its last message. If the identifer codes of the fixed beacons are coded as the geographical locations of the fixed beacons then the wearer of mobile beacon X will be able to determine the approximate position of mobile beacon W. Furthermore in order to determine the location of mobile beacon W, any of the fixed beacons A–J may be similarly interrogated to obtain the last sequential message incorporating the identity code of W. In the present example the messages D-M1 and A-M1 would be retrieved thereby indicating that fixed beacons D and A were closest to mobile beacon W when it last transmitted. It should be apparent that the beacon network allows the position of mine personnel, wearing mobile beacons, to be determined to within one network beacon range, i.e. about 30 m.

It will also be apparent to the skilled worker in the field that the above system is not dependent on a hierarchy amongst the beacons or on a "backbone-and-spur" type communications system. Rather the flow of information throughout the network is multi-directional, furthermore, depending on the topology of the mine, information can usually be passed from one beacon to another by more than one route. For example, in the present case the message M1 could be passed from beacon W to H via beacon D and G or via beacons A, B, C, F and J. Consequently the system enjoys a degree of redundancy so that even in the event of an emergency destroying one or more of the beacons it may well still be possible to maintain communications throughout the remainder of the network. Furthermore, it is a simple matter to add beacons to the network as the area to be monitored is extended. All that is required is that the position and unique identity of the new beacon be recorded with the control centre or alternatively that the unique identity of the new beacon be made the grid coordinate of its position.

Control centre 19 communicates with at least one fixed beacon H by means of a hardwired connection. In the presently described embodiment the hardwired connection comprises an explosion-proof cable sunk down to the fixed beacon via boreholes. In other applications, i.e. non-mining applications for example, other connection means may be more convenient, the system is flexible enough to be adapted to any forseeable future high reliability communications system.

At regular intervals, the control centre 19 records and maps the location of the mobile beacons, and so determines the location of the miners and equipment to which they are attached. Mapping is possible because the control centre maintains a table of the identification numbers of the fixed beacons with coordinates, or other indicators, of their physical location. Failure to locate a mobile beacon triggers an alert state and invokes verification protocols for the last viable received transmission.

In an entirely similar fashion to the mobile beacons, the fixed beacons also randomly transmit an identification message. If a message is not received from all of the beacons in the network, be they fixed or mobile, over a sufficient timeframe then the system will enter an alert state as a beacon malfunction or an emergency state is indicated. The fixed beacons may also incorporate condition or status codes into their messages based on environmental data extracted from their sensors.

In the event of an emergency, the system is capable of locating failure points amongst the fixed beacon network. Such failure points are associated with mine collapse or beacon failure. The failure points are located by routinely monitoring the network for each of the fixed beacon identity codes. The system also interprets the condition codes of network beacons which may contain information concerning the environment about each of the fixed beacons (e.g. temperature, dust levels, availability of power) and mobile beacons (vital signs and identity). Under emergency evacuation procedures, when fixed beacon 13H receives an alert signal from the surface, it will respond on a predetermined protocol and activate the fixed beacons audible and visual alarms. For example the visual indicators of the fixed beacons' may be illuminated so as to indicate the route, determined at the control centre, to be the safest for exit from the mine.

An optional feature of the system is that in the event of an emergency miners are able to transmit appropriate messages by means of their mobile beacon. For example a miner might transmit a message that there is flooding in the mine. Such a message is packaged with the mobile beacons identity code and sequence code and transmitted over the network in the previously described manner. Importantly, upon transmitting such a message, because of the bidirectionality of every network component, the miner will receive verification if his message has been received by a fixed beacon and may receive information from other mobile beacons.

Although the present invention has been described with reference to a preferred embodiment it is not intended that the claims be limited to that embodiment as other variations within the inventive concept will be apparent to those skilled in the art.

What is claimed is:

1. A system for locating a mobile entity in an area including:
   a) a network of fixed communication beacons for relaying messages, said fixed beacons arranged in predetermined locations, the fixed beacons disposed in a flat structure in which all messages are communicable throughout all fixed beacons;
   b) a mobile communication beacon adapted to be attached to the entity to be located and for transmitting mobile messages, said mobile messages being coded to uniquely identify the message and to uniquely identify the mobile communication beacon;
   the beacons being arranged so that operatively, the mobile communication beacon transmits said mobile messages to at least one fixed communication beacon of the network located in its vicinity, said at least one beacon modifying said message by appending a unique beacon identifier and transmitting the modified message to adjacent beacons for transmission throughout the beacon network so that the identity of the at least one fixed communication beacon which first modified the message is stored at each fixed beacon throughout the network.

2. A system according to claim 1, wherein the beacons, be they fixed or mobile, include sensing means for determining external parameters.

3. A system according claim 2, wherein the sensing means of a mobile beacon is adapted to detect the value of a parameter indicative of the operational status of the entity to which said beacon is operatively attached.

4. A system according to claim 3, wherein the mobile beacon is operatively attached to a person, and wherein the sensing means comprises a sensor for monitoring a physiological parameter of said person.

5. A system according to claim 4 wherein the sensing means includes at least one conductive loop for monitoring the heartbeat of said mine worker.

6. A system according to claim 3, wherein the sensing means comprises an accelerometer for monitoring the attitude of said entity.

7. A system according to claim 2, wherein the sensing means of a fixed beacon is adapted to detect the value of a parameter indicative of the external environment adjacent said fixed beacon.

8. A system according to claim 2, wherein the messages generated by beacons, be they fixed or mobile, include information derived from said sensing means.

9. A system according to claim 1, further including a control centre in communication with at least one of said fixed beacons, the control centre including a processing means for processing information derived from said network.

10. A system according to claim 1, wherein the beacons include means for communicating with each other using radio frequency signals.

11. A system according to claim 9, wherein the control centre includes a register of the identities of the beacons in the area and the geographical location of the fixed beacons.

12. A system according to claim 10, wherein the control centre routinely interrogates the message memory of the at least one fixed communication beacon by means of a signal communication connection to ascertain the status of the network.

13. A system according to claim 12, wherein the control centre includes an alarm that is coupled to the processing means and activated by the processing means in the event that no message is received from a mobile beacon in a predetermined timeframe.

14. A system according to claim 13, wherein the control centre determines the last location at which a message was received from the mobile beacon.

15. A method for locating a mobile entity in an area containing a network of beacons, including fixed communication beacons and mobile communication beacons, said fixed beacons being located at recorded positions and in a flat structure in which all messages are communicable throughout all fixed beacons, said mobile entity being fitted with a mobile communication beacon, said method including the steps of:

a) transmitting from the mobile communication beacon a unique message, including data identifying said beacon, to a first one of said fixed communication beacons in the vicinity of said mobile beacon;

b) appending to said message a unique identifier associated with the first at least one fixed communication beacon, thereby forming a modified message;

c) repeatedly transmitting the modified message from communication beacon to adjacent beacons and storing details of the modified message, including the identity of the first at least one beacon which created the modified message at beacons throughout the network;

d) interrogating a beacon to determine the identify of the beacon which created the modified message in order to determine the vicinity of the mobile communication beacon at the time the unique message was transmitted.

16. A method according to claim 15 wherein step c) further includes the steps of:

upon receiving the modified message at a beacon, comparing the unique identifiers of the message with a list of message identifiers and, if said comparison detects a match then taking no further action, and if said comparison does not detect a match then recording the unique identifiers of the message and re-transmitting the modified message to adjacent beacons.

17. A method according to claim 16 further including the step of:

interrogating the unique message identifier list associated with a beacon in order to verify the integrity of the network.

18. A method according to claim 17 wherein the step of verifying the integrity of the network includes:

interrogating the unique message identifier list associated with a beacon to ensure that transmissions have been received from all beacons of the network in a certain timeframe.

19. A method according to claim 17 further including the step of:

upon determining that the integrity of the network has failed raising an alarm.

20. A method according to claim 17 further including the step of:

upon determining that a transmission from a beacon has not been received in a certain timeframe determining the last message received from said beacon.

21. A system for determining the approximate location of each one of a plurality of mobile entities located in an area, the system including:

a plurality of mobile beacons adapted to be worn or carried by each individual and being capable of generating a signal containing an identifier;

a network of at least two fixed beacons having a flat structure in which all traffic is communicable with all beacons, the beacons being located throughout the operating area, each fixed beacon being capable of transmitting a signal and of receiving the signal generated by at least one mobile beacon and the signal generated by at least one other fixed beacon;

means by which the transmitted information may be self-routed to all beacons in the network where it may be stored or interrogated;

means by which the location of the mobile-beacons can be determined, stored and available from at least one other beacon; and a control or monitoring means capable of receiving the signal generated by at least one fixed beacon and therefrom providing an output indicative of the location of each said entity.

22. A system for determining the approximate location of each one of a plurality of mobile entities located in an area and for monitoring at least operational parameter of each of said entities, the system including:

a plurality of mobile beacons adapted to be worn or carried by each individual and being capable of generating a signal containing an identifier and data indicative of the at least one monitored vital sign, each transmitter being associated with a respective sensor capable of monitoring at least one vital sign of the entity wearing or carrying the transmitter;

a network of at least two fixed beacons having a flat structure in which all traffic is communicable with all beacons, the beacons being located throughout the operating area, each fixed beacon being capable of transmitting a signal and of receiving the signal generated by at least one mobile beacon and the signal generated by at least one other fixed beacon;

means by which the transmitted information may be self-routed to all beacons in the network where it may be stored or interrogated;

means by which the location and the status of the entities associated with the mobile beacons can be determined, stored and available from at least one fixed beacon, and a control or monitoring means capable of receiving the signal generated.

23. A system for locating a mobile entity in an area, comprising:

a network of fixed communication beacons arranged in predetermined locations in the area, where a message may be delivered to a fixed communication beacon through plural paths in the network and where the fixed communication beacons are configured to communicate the message to all fixed communication beacons in the network, and a mobile communication beacon attachable to the mobile entity to be located for transmitting a mobile message coded to uniquely identify the message and to uniquely identify the mobile communication beacon, wherein when the mobile communication beacon transmits the mobile message to at least one fixed communication beacon of the network located in its vicinity, the at least one fixed communication beacon is configured to modify the mobile message by appending a unique beacon identifier and to transmit the modified message over plural network paths to adjacent fixed communications beacons for transmission throughout the beacon network so that the identity of the at least one fixed communication beacon which first modified the message is stored at each fixed beacon throughout the network.

24. A system according to claim 23, wherein the fixed and mobile beacons include sensors for determining one or more external parameters.

25. A system according to claim 24, wherein one or more sensors of a fixed beacon is adapted to detect the value of a parameter indicative of the external environment adjacent to the fixed beacon.

26. A system according to claim 24, wherein a message generated by the beacons, be they fixed or mobile, includes information derived from the one or more sensors.

27. A system according to claim 23, wherein a sensor of a mobile beacon is adapted to detect the value of a parameter indicative of an operational status of the entity to which the mobile beacon is operatively attached.

28. A system according to claim 23, wherein the mobile beacon is operatively attached to a person, and includes a sensor for monitoring a physiological parameter of the person.

29. A system according to claim 26, wherein the sensor includes at least one conductive loop for monitoring the heartbeat of the person.

30. A system according to claim 26, wherein the sensor includes an accelerometer for monitoring an attitude of the person.

31. A system according to claim 23, further comprising:
    a control center for communicating with at least one of the fixed beacons including a processor for processing information derived from the network.

32. A system according to claim 31, wherein the control center includes a register of identities of the beacons in the area and a geographical location of the fixed beacons.

33. A system according to claim 31, wherein the control center is configured to routinely interrogate a message memory of the at least one fixed communication beacon to ascertain a status of the network.

34. A system according to claim 33, wherein the control center includes an alarm that is coupled to the processing and activated by the processor in the event that no message is received from a mobile beacon in a predetermined time frame.

35. A system according to claim 34, wherein the control center is configured to determine a last location at which a message was received from a mobile beacon.

36. A system according to claim 23, wherein the beacons are configured to communicate with each other using radio frequency signals.

37. A system according to claim 23, wherein functioning fixed communication beacons can still communicate even if there is a failure in part of the network.

38. A method for locating a mobile entity in an area containing a network including fixed communication beacons located at recorded positions in the area and mobile communication beacons, where a message may be delivered to a fixed communication beacon over plural paths in the network so that the message is communicated with all fixed communication beacons, the mobile entity being fitted with a mobile communication beacon, comprising:

a) transmitting from the mobile communication beacon a mobile message, including data identifying the mobile communication beacon, to one of the fixed communication beacons in the vicinity of the mobile communication beacon;

b) appending to the mobile message a unique identifier associated with the one fixed communication beacon, thereby forming a modified message;

c) transmitting the modified message from the one fixed communication beacon to adjacent fixed communication beacons via the plural network paths and storing thereat information associated with the modified message, including the identity of the one beacon which created the modified message, so that the information associated with the modified message is relayed to all fixed communication beacons in the network; and d) interrogating a fixed communication beacon to determine the identity of the one beacon which created the modified message in order to determine the vicinity of the mobile communication beacon at the time the mobile message was transmitted.

39. A method according to claim 38, wherein step c) further includes the steps of:
    upon receiving the modified message at a fixed communication beacon, comparing the unique identifier of the message with a list of message identifiers, and if a match is not detected, then recording the unique identifier of the message and re-transmitting the modified message to adjacent beacons.

40. A method according to claim 39, further including the step of:
    interrogating the message identifier list to verify the integrity of the network.

41. A method according to claim 40, wherein verifying the integrity of the network includes:
    interrogating the message identifier list associated with a beacon to ensure that transmissions have been received from all fixed communications beacons of the network in a certain time frame.

42. A method according to claim 40, further including the step of:
    upon determining that the integrity of the network has failed, raising an alarm.

43. A method according to claim 40, further including the step of:
    upon determining that a transmission from a beacon has not been received in a certain time frame, determining a last message received from the beacon.

44. A method according to claim 38, wherein a functioning fixed beacon can still communicate via the network even if there is a failure in part of the network.

45. The system for determining an approximate location of each one of a plurality of mobile entities located in an area and for monitoring at least one operational parameter of each of the mobile entities, comprising:

a plurality of mobile beacons each adapted to be worn or carried by an individual and being capable of generating a signal containing an identifier and data indicative of the at least one monitored parameter, each mobile beacon being associated with a respective sensor capable of monitoring at least one physiological parameter of the mobile entity wearing or carrying the mobile beacon;

a network of fixed beacons each being capable of communicating with all fixed beacons, the fixed beacons being located throughout the operating area, each fixed beacon being capable of receiving information from at least one mobile beacon and of transmitting that information to another fixed beacon such that the transmitted information is propagated to all fixed beacons in the network; and a controller capable of receiving the transmitted information and determining the location and status of the mobile entities associated with the mobile beacons including the status of the at least one physiological parameter of each mobile entity.

46. The system in claim 45, wherein a functioning fixed beacon can still communicate via the network even if there is a failure in part of the network.

* * * * *